US010616088B2

(12) United States Patent
Meilik et al.

(10) Patent No.: US 10,616,088 B2
(45) Date of Patent: Apr. 7, 2020

(54) APPARATUS AND METHOD FOR MEASUREMENTS AT INTERMEDIATE NODES IN END-TO-END PERFORMANCE TEST

(71) Applicant: Avago Technologies International Sales Pte. Limited, Singapore (SG)

(72) Inventors: Israel Meilik, Yakum (IL); Assaf Shacham, Yakum (IL); Roii Werner, Yakum (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 211 days.

(21) Appl. No.: 15/798,185

(22) Filed: Oct. 30, 2017

(65) Prior Publication Data

US 2019/0020551 A1  Jan. 17, 2019

Related U.S. Application Data

(60) Provisional application No. 62/532,294, filed on Jul. 13, 2017.

(51) Int. Cl.
*H04L 12/24* (2006.01)
*H04L 12/26* (2006.01)
(52) U.S. Cl.
CPC .......... *H04L 43/106* (2013.01); *H04L 41/142* (2013.01); *H04L 43/0835* (2013.01); *H04L 43/0858* (2013.01); *H04L 43/0882* (2013.01); *H04L 43/16* (2013.01); *H04L 41/5009* (2013.01)

(58) Field of Classification Search
CPC ........................... H04L 41/142; H04L 43/106
See application file for complete search history.

(56) References Cited

U.S. PATENT DOCUMENTS

| | | | |
|---|---|---|---|
| 6,839,754 B2 * | 1/2005 | Nowak | H04L 41/12 709/224 |
| 2001/0021176 A1 | 9/2001 | Mimura et al. | |
| 2004/0052259 A1 | 3/2004 | Garcia et al. | |
| 2005/0036512 A1 | 2/2005 | Loukianov | |
| 2006/0067232 A1 | 3/2006 | Lee et al. | |
| 2007/0097865 A1 | 5/2007 | Song et al. | |
| 2008/0159287 A1 * | 7/2008 | Nagarajan | H04L 12/66 370/392 |
| 2010/0125661 A1 * | 5/2010 | Perala | H04L 43/0852 709/224 |
| 2010/0238939 A1 * | 9/2010 | Lee | H04L 1/1854 370/400 |

(Continued)

FOREIGN PATENT DOCUMENTS

EP        2961102 A1 * 12/2015 ......... H04L 43/0829

*Primary Examiner* — Parth Patel
(74) *Attorney, Agent, or Firm* — Sterne, Kessler, Goldstein & Fox, P.L.L.C.

(57) ABSTRACT

A communication network that includes a communication path is provided including a source node, a destination node, and a plurality of intermediate nodes that connect the source node to the destination node by corresponding network segments. The intermediate nodes are configured to perform measurements and individually generate segment performance statistics that enable a session manager to more precisely determine a network segment that is causing data traffic congestion by comparing the various segment performance statistics to each other.

20 Claims, 11 Drawing Sheets

(56) References Cited

U.S. PATENT DOCUMENTS

| | | | | |
|---|---|---|---|---|
| 2012/0072526 A1* | 3/2012 | Kling | H04L 67/06 |
| | | | 709/213 |
| 2012/0275333 A1* | 11/2012 | Cociglio | H04L 43/106 |
| | | | 370/252 |
| 2013/0094398 A1* | 4/2013 | Das | H04W 12/00 |
| | | | 370/254 |
| 2013/0195106 A1* | 8/2013 | Calmon | H04B 7/15521 |
| | | | 370/389 |
| 2015/0110097 A1* | 4/2015 | Morrill | H04L 41/0896 |
| | | | 370/338 |
| 2015/0288594 A1* | 10/2015 | Yin | H04W 24/04 |
| | | | 370/252 |
| 2015/0363949 A1* | 12/2015 | Manohar | H04L 41/145 |
| | | | 345/441 |
| 2016/0043823 A1* | 2/2016 | Zhao | H04J 3/0697 |
| | | | 370/350 |
| 2017/0054612 A1* | 2/2017 | Yi | H04W 4/70 |
| 2017/0272485 A1* | 9/2017 | Gordon | H04N 21/222 |
| 2018/0026897 A1* | 1/2018 | Eller | H04L 43/0882 |
| | | | 370/234 |
| 2018/0324076 A1* | 11/2018 | Tidwell | H04L 43/12 |
| 2019/0020563 A1 | 1/2019 | Meilik et al. | |

\* cited by examiner

APPARATUS AND METHOD FOR MEASUREMENTS AT INTERMEDIATE NODES IN END-TO-END PERFORMANCE TEST

CROSS REFERENCE TO RELATED APPLICATIONS

This application claims the benefit of U.S. Provisional Application No. 62/532,294, filed on Jul. 13, 2017, which is incorporated herein by reference in its entirety.

FIELD

Embodiments of the present disclosure provide systems and methods for segment performance measurements at intermediate nodes in communication network.

BACKGROUND

A communication network can include a plurality to nodes, including a source node and a destination node. The source rode is the "source" of data packets that are transmitted to the destination node via a "path" through the communication network that includes a number of intermediate nodes. Network performance may be tested, for service activation or otherwise, at the destination node. Other tests exist ("two-way tests"), where a reflector node is defined. The reflector node receives data packets from the source node, and returns them immediately to the source node, which also acts as a destination node for segment performance testing.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. In the following description, numerous specific details are set forth in order to provide a thorough understanding. However, it will be apparent to those skilled in the art that the disclosure, including structures, systems, and, methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
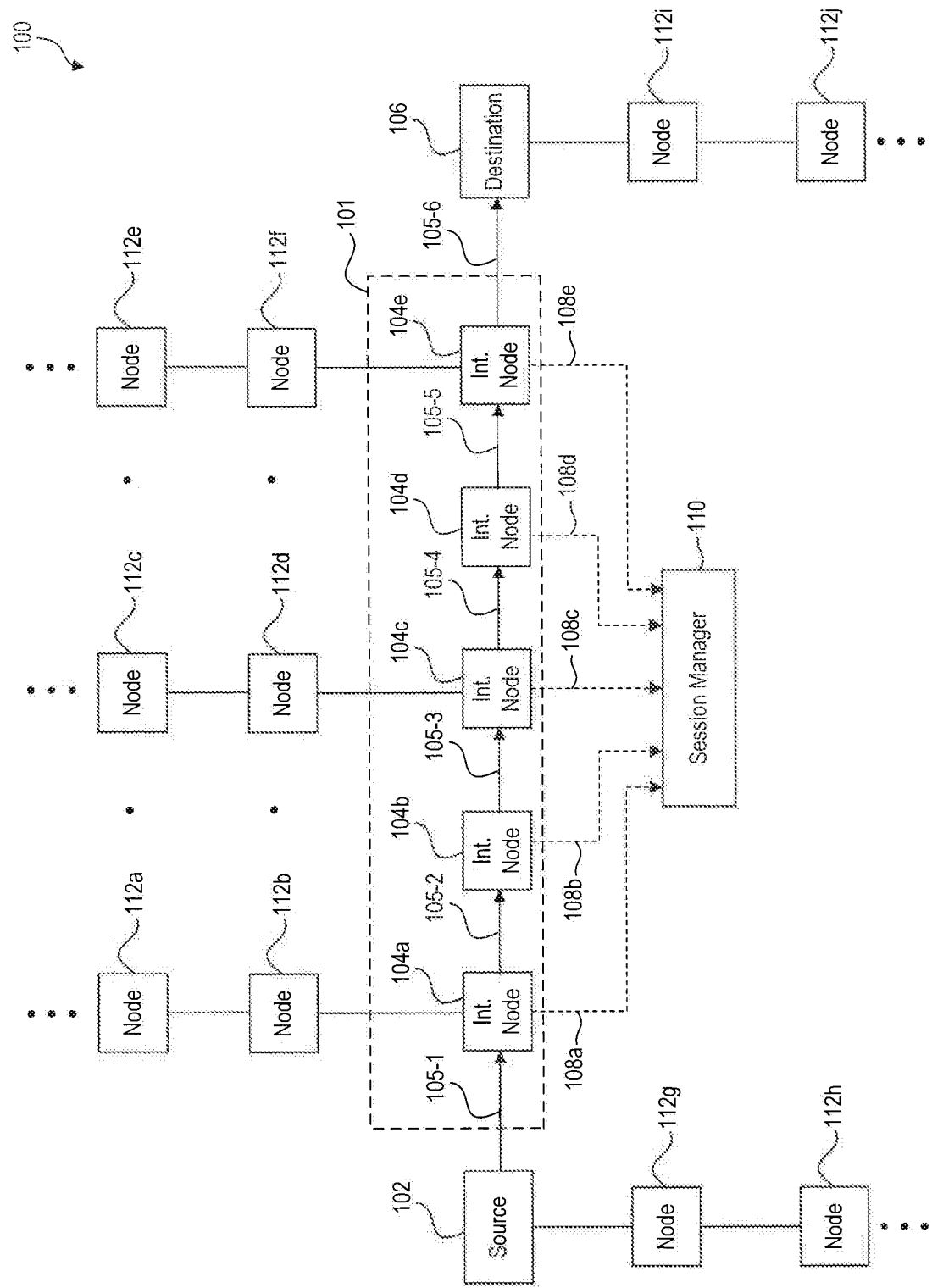
FIG. 1 illustrates a communication network having a path including a plurality of intermediate nodes according to embodiments of the present disclosure.

FIG. 1 illustrates an example communication network 100 that operates according to embodiments of the present disclosure. Communication network 100 includes a path 101 that communicates data packets from a source node 102 to a destination node 106 via a plurality of intermediate nodes 104a-e that define the path 101. The intermediate nodes 104 are connected to each other, and source node 102 and the destination node 106 by a plurality of network segments (e.g., "segments") 105-1 through 105-6 as shown. Specifically, during operation, each intermediate node 104 receives data packets that are processed one-by-one and then re-transmitted to a subsequent intermediate node 104 using the corresponding network segment 105, until reaching the destination node 106.

Communication network 100 can include additional nodes 112a-j that are external to the path 101 defined between the source node 102 and the destination node 106; and therefore, the path 101 can be a portion of the communication network 100 for example purposes. Further, one skilled in the art will recognize that any of the intermediate nodes 104 can also be a "source" or "destination" of/for a particular flow of data packets, and therefore also be a "source" node or a "destination" node for the particular flow of data packets. In an embodiment, the communication network 100 is an Ethernet communication network that communicates Ethernet packets.

As will be described herein, intermediate service performance measurements are performed at one or more of the intermediate nodes 104a-e, instead of the destination node 106, so as to test the integrity of the path 101. The measurements are based on information embedded in a number of data packets, such information including time stamps, and/or sequence numbers associated with the corresponding data packets. By performing the local measurements (e.g., packet delay, packet loss, data rate, etc.) at the individual intermediate nodes 104, a management entity can more accurately detect locations of packet congestion in the path 101 when compared to measurements being performed at the destination node 106. More specifically, as will be shown herein, specific segments 105 or intermediate nodes 104 can be identified as being overloaded, and therefore the cause for packet delay, loss, and/or increased congestion level.

Figure 2A:
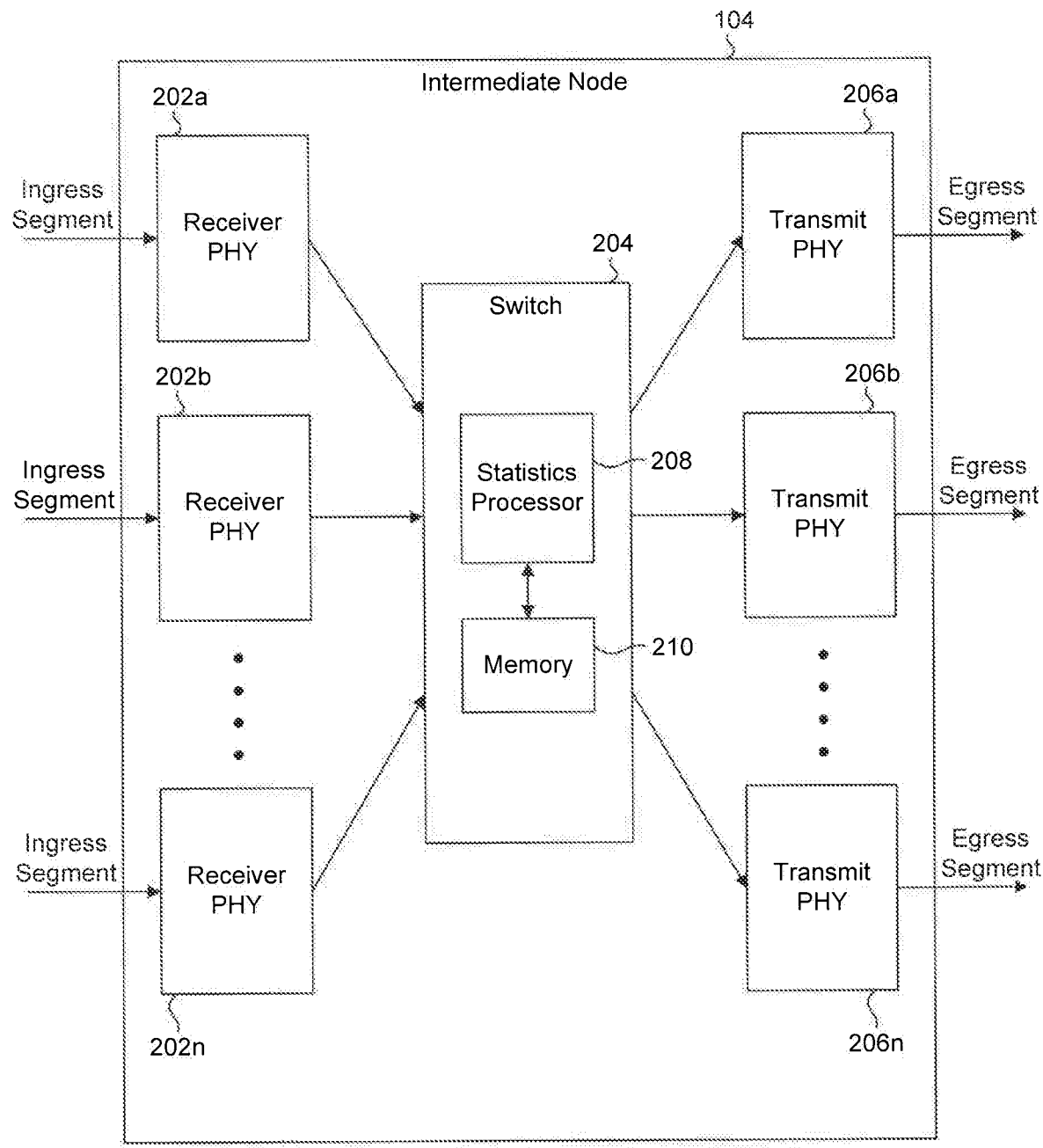
FIG. 2A illustrates an example intermediate node according to embodiments of the present disclosure.

FIG. 2A illustrates an exemplary intermediate node 104 according to embodiments of the present disclosure. The intermediate node 104 includes a plurality of receiver physical layer devices (PHYs) 202a-n, a switch 204, and a plurality of transmitter PHYs 206a-n. Each receiver PHY 202 includes circuitry to receive data packets in serial analog form received over a corresponding ingress segment 105, and convert the data packets to digital using an analog-to-digital converter for presentation to the switch 204. The switch 204 examines the data packets to determine the destination, and performs the necessary switching function on a packet-by-packet basis to forward the data packets to the proper transmit PHY 206 to reach a destination node, such as destination node 106. Accordingly, the switch 204 can route data packets from any receive PHY 202 to any transmit PHY 206 on a packet-by-packet basis as will understood by those skilled in the art. Each transmitter PHY 206 includes circuitry to convert the output of the switch 204 from digital to analog form using a digital-to-analog converter, and re-transmit the data packets to the next intermediate node 104, or a destination node, such as destination node 106.

Additionally, the switch 204 further includes a segment statistics processor (e.g., "statistics processor") 208 and associated internal or an external memory 210 that stores instructions that cause the statistics processor 208 to perform the functionality described herein, in addition to storing segment performance data measured at the intermediate node 104. As will be described herein, the statistics processor 208 performs local measurements based on information embedded in the data packets to support intermediate service performance evaluation of path 101 for a particular data flow through the communication network 100, such measurements including packet delay, packet loss rate, and packet data rate.

Figure 2B:
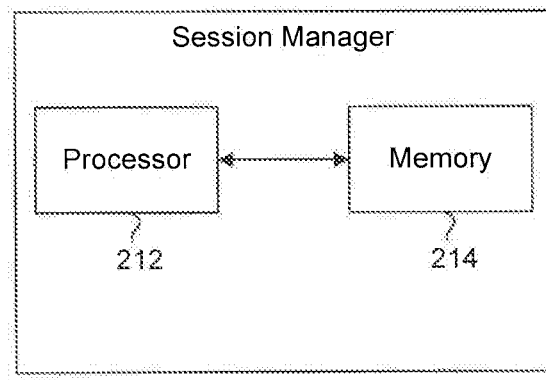
FIG. 2B illustrates an example session manager according to embodiments of the present disclosure.

FIG. 2B illustrates an exemplary session manager 110 according to embodiments of the present disclosure. The session manager 110 includes a processor 212 and an internal or an external memory 214 that stores instructions that cause the statistics processor 212 to perform the functionality described herein for the session manager 110. In embodiments of the disclosure, the session manager 110 is incorporated in one of source 102 or the destination 106.

Figure 3:
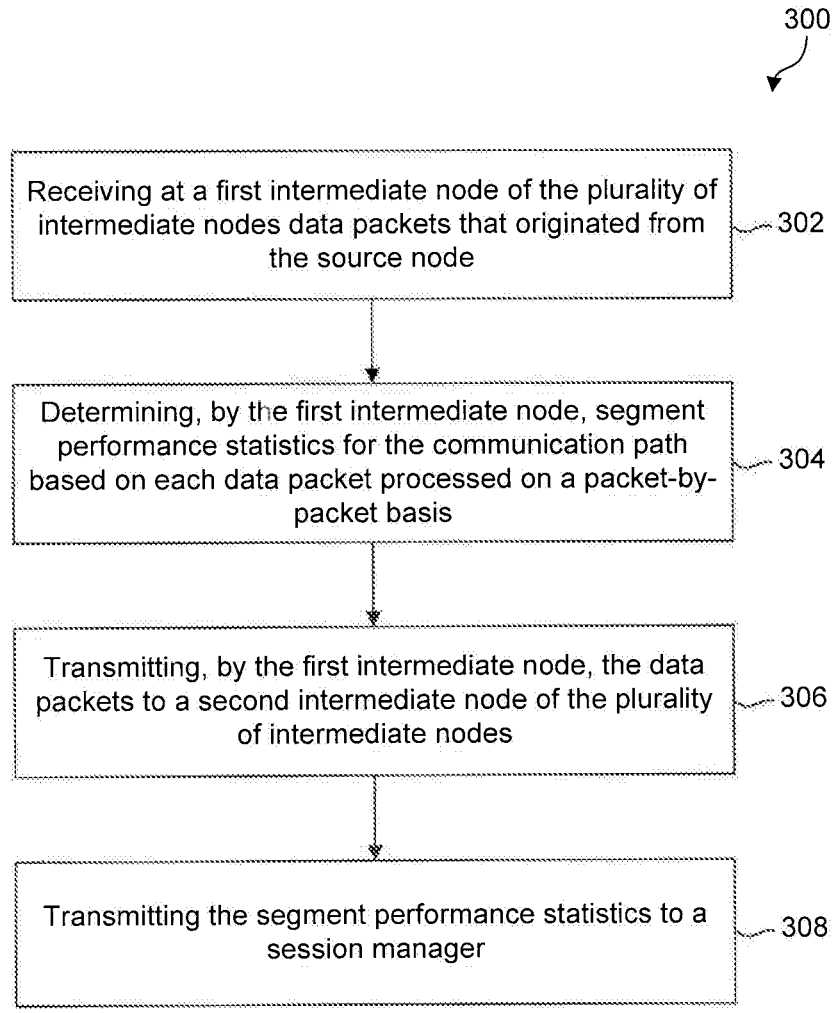
FIG. 3 illustrates a flowchart describing the local segment measurements performed by an intermediate node according to embodiments of the present disclosure.

FIG. 3 illustrates a flowchart 300 that further describes the local segment analysis performed by an intermediate rode 104 on a packet-by-packet basis according to embodiments of the present disclosure. The flowchart further describes that the results of the segment analysis are forwarded to the session manager 110 for further processing.

In step 302, data packets that originated from a source node 102 are received at one of the intermediate nodes 104. For example, referring, to FIG. 2, receiver PHY 202a in an intermediate node 104 can receive data packets (one-by-one) and convert them from analog form to digital form for further processing by the switch 204. Each data packet includes both a source timestamp Ts and sequence number Sn; where the source timestamp Ts represents the time at which the data packet was transmitted from the source node 102, and the sequence number Sn is the number of the particular data packet in a number of data packets, where the data packets can be Ethernet data packets or test packets.

The receiver PHY 202a also generates a receive timestamp Tr for each data packet that identifies the time at which the data packet was received by the receiver PHY 202a, which is forwarded along with the data packet to the switch 204 for farther processing.

In step 304, segment performance statistics are determined at the intermediate node 104 based on the data packets and/or associated information (e.g. timestamps and sequence numbers Sn). The segment performance statistics are determined on a packet-by-packet basis as the packets are processed for switching to the particular transmit PHY 206. For example, the statistics processor 208 can determine packet delay for each packet (e.g. packet-by-packet) from the source node 102 to the particular intermediate node 104, by the calculation:

packet delay=receive timestamp ($Tr$)–source timestamp ($Ts$).

Further, the statistics processor 208 can determine any variation in packet delay over a number of data packets by comparing a number of packet delays, and any variation in packet delay over the number of data packets. Still, further, the statistics processor 208 can determine any packet loss by examining the sequence numbers Sn and determining if any are out of order or simply missing.

In an embodiment, the determination of segment performance statistics in step 304 can be determined contemporaneous with any switching functionality performed by the switch 204 to switch data packets to a particular transmit PHY 206 for delivery to the proper destination node, e.g. destination node 106. In another embodiment, each data packet is replicated before retransmission to the next intermediate node and can be stored in the memory 210. Afterwhich, the performance statistics are determined based on the replicated data packets while the original data packets are re-transmitted by the appropriate transmit PHY 206.

In step 306, the data packets are re-transmitted to the subsequent intermediate node 104 along the path 101, or to the destination node 106. For example, switch 204 can direct each data packet to a particular transmit PHY 206 based on the destination addresses carried in the individual data packets, which is usually found in a packet header. The particular transmit PHY 206 can transmit the corresponding data packets one-by-one to the next intermediate node 104 along the path 101.

In step 308, the segment performance statistics are transmitted to a session manager at the end of a session, e.g. test session after a number of data packets are analyzed on a packet-by-packet basis as described above. For example, a transmitter PHY 206 can be used to transmit the segment performance statistics 108 to the session manager 110 after the preceding steps 302-306 are performed over a number of data packets on a packet-by-packet basis. In an embodiment, the session manger 110 is incorporated in the destination node 106. Alternatively, the session manger 110 can be incorporated in the source node 102. As will be described below, the session manager 110 can determine variations from the expected packet delay that is experienced among, the plurality of intermediate nodes 104a-e, or example, if an intermediate node 104 is operating properly, then the delay measured in that node 104 should be below a certain threshold representing an expected latency for that node. The expected latency can be based on a service level agreement for a particular customer or consumer of the data transmission that specifies an upper boundary for transmission latency. In another example, if all the network segments 105 are operating properly in the path 101, then the incremental delay measured from the source 102 should increase in a step-wise fashion according to a reasonably expected latency of each segment 105. Again, the expected latency can be based on a service level agreement for a particular customer or consumer of the data transmission. If there is a noticeable increase in delay in an intermediate node or in the incremental packet delay between adjacent segments 105 (e.g., above a threshold), then it can be determined that the corresponding node 104 or segment 105 is experiencing congestion that may need further attention. For example, if the incremental packet delay measured by intermediate node 104c increases above a threshold relative to that of intermediate node 104b, then it can be determined that the segment 105-3 is likely congested, and needs further attention. Similar analysis can apply to an increase in lost data packets based on the sequence numbers Sn. The expected latency discussed above can also be based on knowledge of previous latencies observed for segments 105 over a time period of use.

Figure 4:
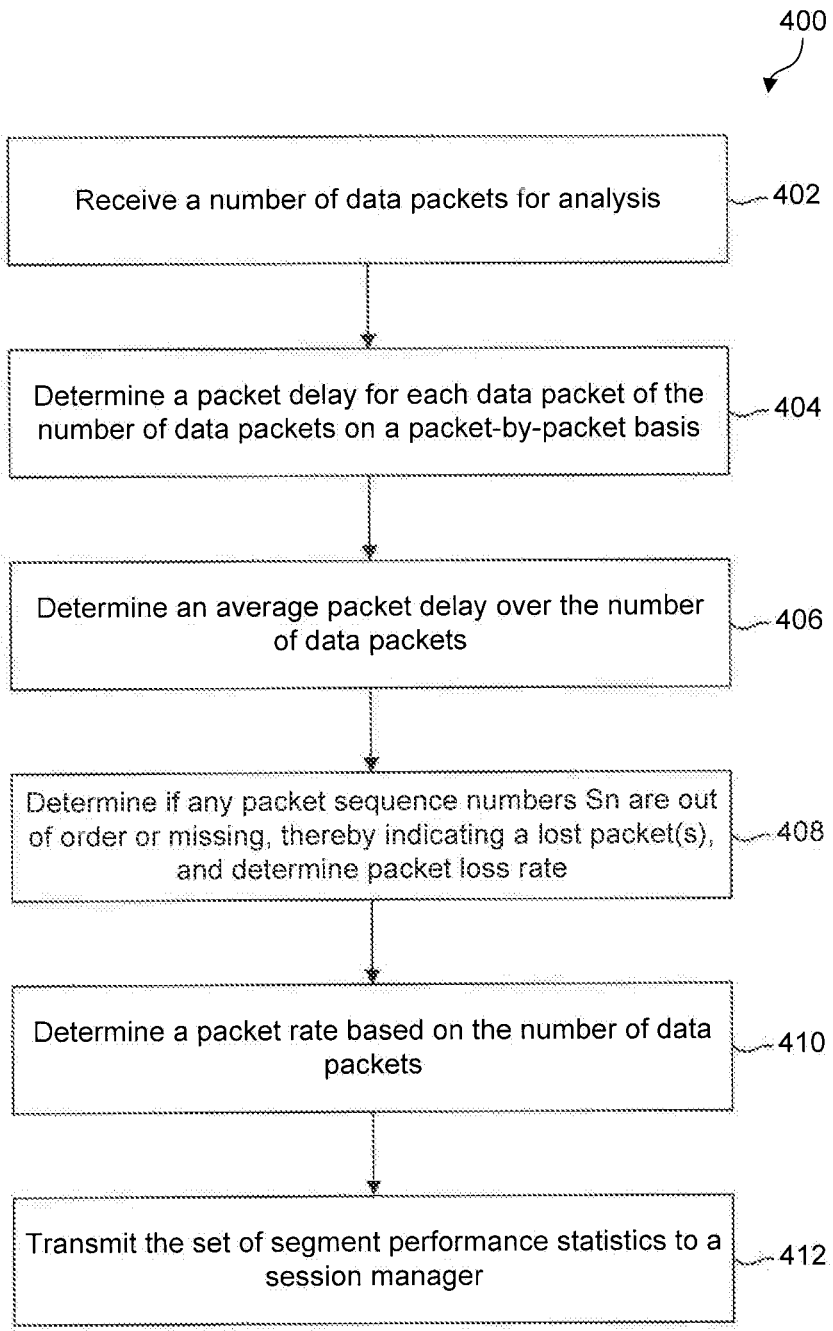
FIG. 4 illustrates a flowchart, describing operations performed by an intermediate node to determine segment performance statistics according to embodiments of the present disclosure.

FIG. 4 illustrates a flowchart 400 that further describes the step 304 of determining, segment performance statistics for the communication path 101 according to embodiments of the disclosure. In embodiments, the flowchart 400 is performed by the statistics processor 208 according to embodiments of the disclosure.

In step 402, data packets are received for analysis at an intermediate node 104 on a packet-by-packet basis. For example, the statistics processor 208 can receive a number of data packets on a packet-by-packet basis, including their associated receive timestamps (Tr) that identify their time of receipt by the receiver PRY 202, source timestamps (Ts) that identify their time of transmit by the source 102, and sequence number (Sn) that determines their location in the sequence.

In step 404, the statistics processor 208 can determine a packet delay for each data packet of a number of data packets on a packet-by-packet basis, where the packet delay is measured from the source node 102 to the particular intermediate node 104, by the calculation:

packet delay=receive timestamp (Tr)–source timestamp (Ts).

In step 406, the statistics processor 208 can determine an average packet delay over the number of data packets using the calculated packet delays for the individual data packets, and can determine the variation in the packet delay over the number of data packets by storing a histogram of delays and/or calculating a standard deviation.

In step 408, the statistics processor 208 can determine if any packet sequence numbers Sn are missing or out of order, thereby indicating a lost or misplaced data packet. For example, if the sequence numbers Sn for the number of data packets were found to be $S_1$, $S_2$, $S_4$, $S_5$, . . . , then clearly packet $S_3$ is lost or out of sequence, which can indicate congestion at a node 104 or a segment 105 that is associated with the intermediate node 104 performing the analysis. Further, the statistics processor 208 can further determine a packet loss rate, e.g., the ratio number of data packets lost to the number of data packets transmitted by the source node in total over a predetermined period of time.

In step 410, the statistics processor 208 can determine the packet rate based on the number data packets. For example, the statistics processor 208 can determine the packet rate by dividing the number of data packets by the time-for-receipt, where the time-for-receipt is total time to receive the number of data packets as determined by the receive time stamps Tr that were created by the receiver PHY 202.

In step 412, the statistics processor 208 can cause a set of segment performance statistics to be transmitted or relayed to the session manager 110 at the end of a session, e.g. test session after a number of data packets are analyzed on a packet-by-packet basis as described above. The set of the segment performance statistics can include: average packet delay, variation in packet delay, packet loss (e.g. number of packets lost), packet loss rate, and packet rate over the number data packets.

As will be apparent to one skilled in art based the discussion given herein, the segment performance statistics that are gathered at each intermediate node 104 are indicative of local congestion that is experienced by the particular intermediate node 104, thereby making correction easier. This is so because any notable increase in packet delay or packet loss for a particular intermediate node 104 compared to the others is indicative of increased data traffic congestion at the particular intermediate node 104.

Figure 5:
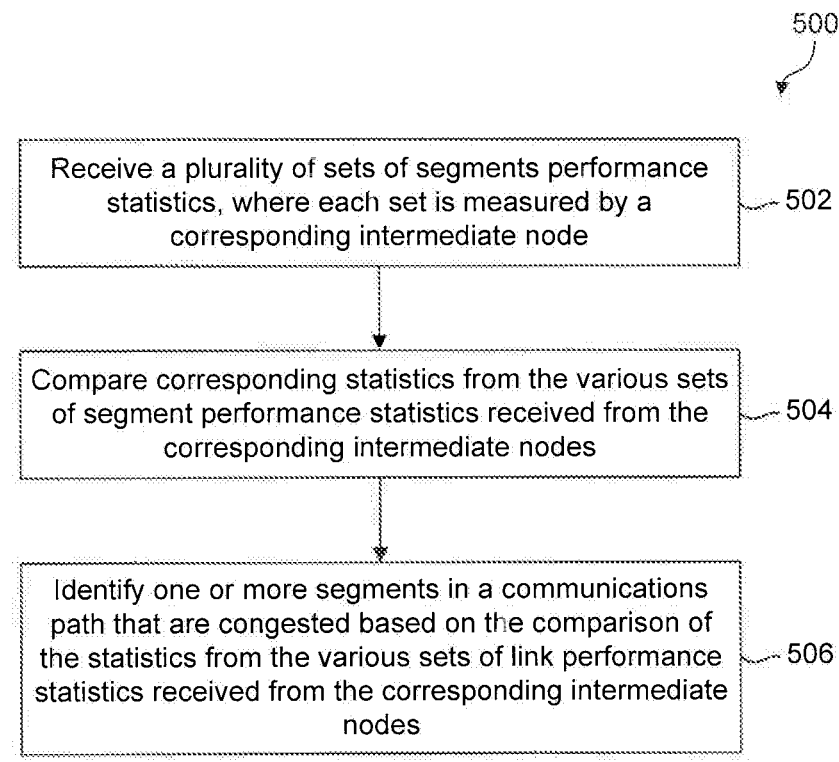
FIG. 5 illustrates a flowchart describing operations performed by a session manager to diagnose traffic congestion based on the segment performance statistics provided by intermediate nodes according to embodiments of the present disclosure.

FIG. 5 describes a flowchart 500 that describes the processing of a plurality of sets of segment performance statistics 108 that are received from corresponding intermediate nodes 104, according to embodiments of the disclosure. The flowchart 500 can be performed by the session manager 110 according to embodiments of the present disclosure.

In step 502, the session manger 110 receives a plurality of sets of segment performance statistics 108, where each set is measured by a corresponding intermediate node 104. As indicated above, the set of segment performance statistics from each intermediate node 104 may include: average packet delay, variation in packet delay, packet loss rate (e.g. ratio of packets lost to packets received), and data rate over a number of data packets that were measured at the corresponding intermediate node 104.

In step 504, the session manager 110 compares corresponding statistics from the various sets of segment performance statistics 108 received from the corresponding intermediate nodes 104 to determine a relative segment quality and/or congestion level experienced by the corresponding intermediate nodes 104. Herein, relative segment quality refers to the relative measures of packet delay, packet loss rate, and data rate as described herein, or a subset of the above measures, which are reflective of traffic congestion.

In step 506, the session manager 110 can identify segments (if any) in the communication path that have low relative segment quality and/or a high congestion level based on the comparison of the segment statistics from the various sets of segment performance statistics 108 received from the corresponding intermediate nodes 104. An advantage of the present disclosure can now be seen. By performing the local measurements (packet delay, packet loss, etc.) at the intermediate nodes 104, the session manager 110 is able to more accurately detect congestion in the communication path 101 than if these measurements are performed at the destination node 106. More specifically, as indicated herein, a specific node 104 or segment 105 can be identified as the cause for increased packet delay, and/or increased congestion level.

In embodiments of the disclosure, the segment performance statistics and operations by the session manager 110 are consistent with one or more of the following test standards: RFC2544, RFC4645 (OWAMP), RFC5357 (TWAMP), ITU Y.1563, ITU Y.1564 (SAT).

Figure 6:
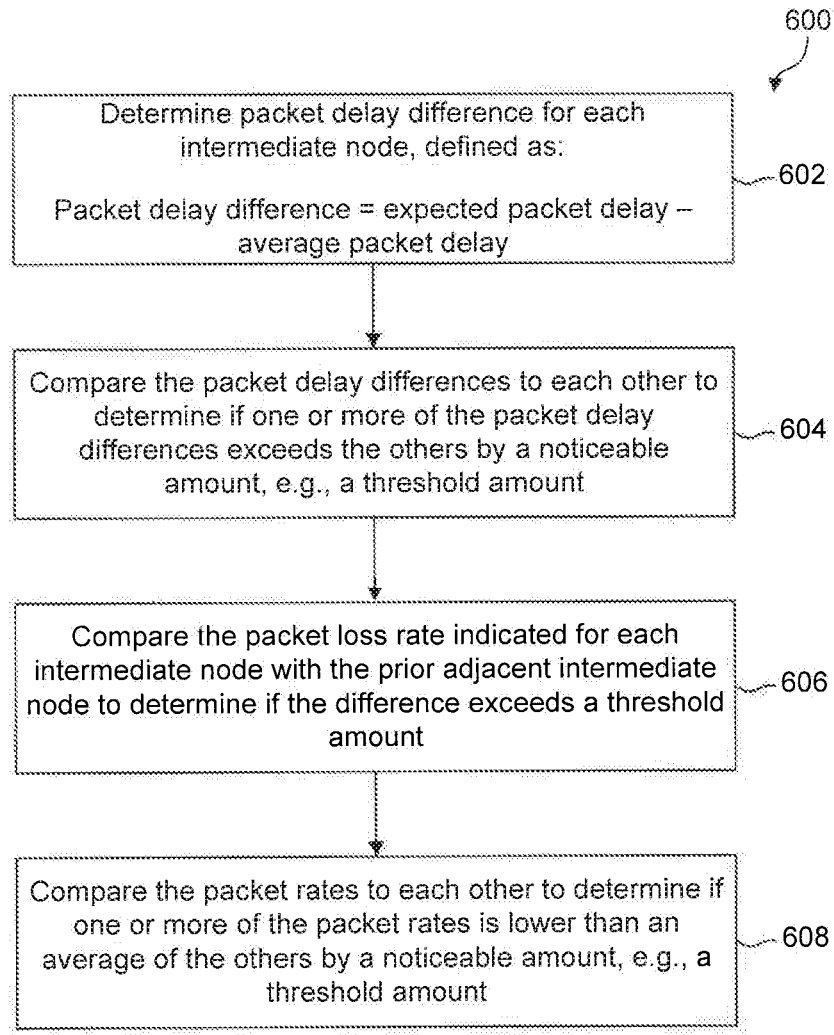
FIG. 6 illustrates a flowchart describing operations performed by a session manager to compare various segment performance statistics from the intermediate nodes to each other, according to embodiments of the present disclosure.

FIG. 6 illustrates a flowchart 600 that further describes the step 504 that compares corresponding statistics from the various sets of segment performance statistics 108 received from the corresponding intermediate nodes 104. In embodiments of the disclosure, flowchart 600 is performed by the session manager 110.

In step 602, the session manager 110 compares the average measured packet delay for each intermediate node 104 to an expected average packet delay that is determined based on a service level agreement to generate a packet delay difference for each intermediate node 104, according the equation:

Packet delay difference=expected packet delay−average measured packet delay;

where the expected packet delay is based on a service level agreement with a customer or consumer of the data flow.

Alternatively, the expected packet delay for an intermediate node 104 can be based on historical observation.

In step 604, the session manager 110 compares the packet delay variations to each other to determine if one or more of the packet delay variations exceeds the others by a noticeable amount, e.g., a first threshold. If so, then the corresponding segments 105 can be identified as contributing to any traffic congestion in the overall communication path 101. For example, if the packet delay variation of intermediate node 104c is determined to exceed the others by a threshold amount (or exceed an average of the others by a threshold amount), then the segment 105-3 is likely the cause of any data traffic congestion (e.g. lost packets, packet delay). Alternatively, the packet delay variations can be compared to an absolute threshold, irrespective of the comparison to the other segments.

In step 606, the session manager 110 compares the packet loss rate indicated in each set of segment performance statistics 108 for the corresponding intermediate nodes 104 to each other. If any intermediate node 104 experiences a packet loss rate noticeably greater than that of a prior adjacent intermediate node 104, then the intervening segment 105 with the prior adjacent intermediate node 104, can be identified as the likely the cause of any traffic congestion in the network segment. For example, if the packet loss rate reported by intermediate node 104c is noticeably higher than that of intermediate node 104b by a threshold amount, then then segment 105-3 is likely the cause of any data traffic congestion. Alternatively, the packet loss rate can be compared to an absolute threshold, irrespective of the comparison to the other segments.

In step 608, the session manager 110 compares the data rate indicated in each set of segment performance statistics 108 for the corresponding intermediate nodes 104 to each other. If any intermediate node 104 has a data rate noticeably lower than the others, e.g. different by a threshold amount, then the intervening segment 105 can be identified as the likely the cause of any traffic congestion in the communication path. For example, if the data rate reported by intermediate node 104c is noticeably lower than an average of the other data rates by a threshold amount, then the segment 105-3 is likely the cause of any data traffic congestion.

As will be apparent based on the discussion provided herein, the comparisons described in steps 606-608 provide a relative segment quality that is being experienced by the intermediate nodes 104. In other words, for any particular intermediate node 104, the comparisons provide a segment quality measurement that is relative to the other intermediate nodes 104 that can be used to pin-point a network segment 105 of the plurality or network segments 105 that are the likely cause, of traffic congestion.

Figure 7:
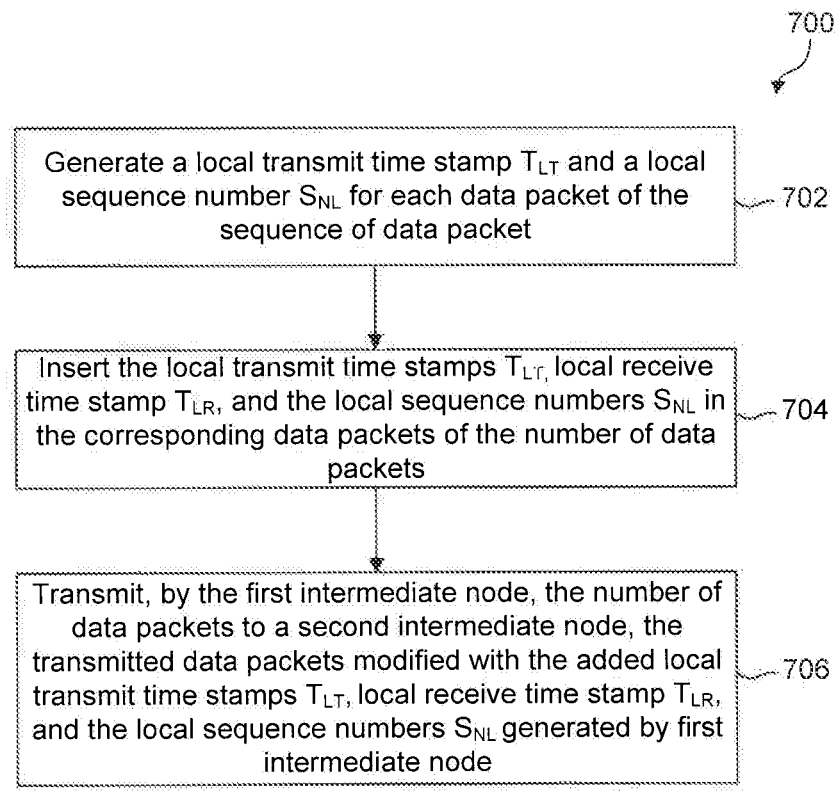
FIG. 7 illustrates a flowchart that further describes transmitting, by a first intermediate node, a number of data packets to a second intermediate node 104 so as to incorporate the local transmit timestamps and sequence numbers that are generated and inserted in the number of data packets upon transmission.

Local Transmit Timestamp and Sequence Number Insertion at the Intermediate Nodes The embodiments described above determine the segment performance statistics based on the source timestamps (Ts) and sequence numbers (Sn) that are originated and inserted into the data packets by the source node 102. In another embodiment, the intermediate nodes 104 can additionally generate local transmit time stamps and local sequence numbers for insertion into the data packets before they are transmitted to the subsequent intermediate node 104. More specifically, each intermediate node 104 can generate a local receive timestamp ($T_{LR}$) and a local transmit timestamp ($T_{LT}$) for each data packet of the number of data packets, wherein the local receive timestamp ($T_{LR}$) identifies the time of receive at the current intermediate node 104, and the local transmit timestamp ($T_{LT}$) identifies the time of transmit for the corresponding data packet from the current intermediate node 104 to the subsequent intermediate node 104. Similarly, each intermediate node 104 can also generate a local sequence number ($S_{LN}$) that is generated for each data packet of the number of data packets. In doing so, the segment performance statistics that were described above can be generated based on the local receive timestamp ($T_{LR}$), the local transmit timestamp ($T_{LT}$) and the local sequence number ($S_{LN}$) to determine segment quality and associated traffic congestion. FIGS. 7-8 discussed below further describe local timestamps and sequence number insertion at the intermediate nodes, and the subsequent segment performance statistics based on the same.

FIG. 7 illustrates a flowchart 700 that further describes the step 306 in flowchart 300 of transmitting, by a first intermediate node 104, a number of data packets to a second intermediate node 104, so as to incorporate the local receive timestamps, local transmit timestamps and sequence numbers in the corresponding data packets upon transmission. In embodiments of the disclosure, flowchart 700 is performed by the transmitter 206 as packets are transmitted one-by-one on a packet-by-packet basis from the intermediate node 104.

In step 702, the transmitter PHY 206 generates a local transmit time stamp $T_{LT}$ and a local sequence number $S_{NL}$ for each data packet of the number of data packets on a packet-by-packet basis; where the local transmit time stamp $T_{LT}$ identifies the time of transmit for the particular data packet from the transmitter PHY 206. The local sequence number $S_{NL}$ may be different from Sn described above if one or more data packets have been lost prior to reaching the current intermediate node 104. Further, as indicated above, a receive timestamp ($T_R$) can be generated by the receiver PHY 202 for each data packet, (renamed local receive timestamp $T_{LR}$ in this section for naming consistency with the other local timestamps), wherein the local receive timestamp ($T_{LR}$) identifies the time of receipt at the receiver PHY 202 for each corresponding data packet.

In step 704, the transmitter PHY 206 inserts the local receive time stamp $T_{LR}$, the local transmit time stamp $T_{LT}$ and the local sequence number $S_{NL}$ in each corresponding data packet prior to transmission of the data packet to the subsequent intermediate node 104 from the current intermediate node 104, and performs the transmission in step 706. More specifically, the transmitter PHY 206 edits each data packet to add the corresponding local receive time stamp $T_{LR}$, local transmit time stamp $T_{LT}$, and the local sequence number $S_{NL}$ generated by its corresponding intermediate node 104 to the others provided by previous intermediate nodes 104.

It is noted that the insertion of the local transmit time stamp $T_{LT}$, local sequence number $S_{NL}$, and local receive timestamp $T_{LR}$ in the corresponding data packets may cause the data packets to increase in length by the processing of each additional intermediate node 104 that is traversed until the destination node 106 is reached. This is so because each additional intermediate node 104 adds its own local receive time stamp $T_{LR}$, local transmit time stamp $T_{LT}$, and the local sequence number $S_{NL}$ to those that have already been added by prior intermediate nodes 104, and those originally generated by the source 102. In TWAMP, this is addressed by transmitting longer packets from the source, where packet space is included for the information that is to be added by the intermediate nodes.

Figure 8A:
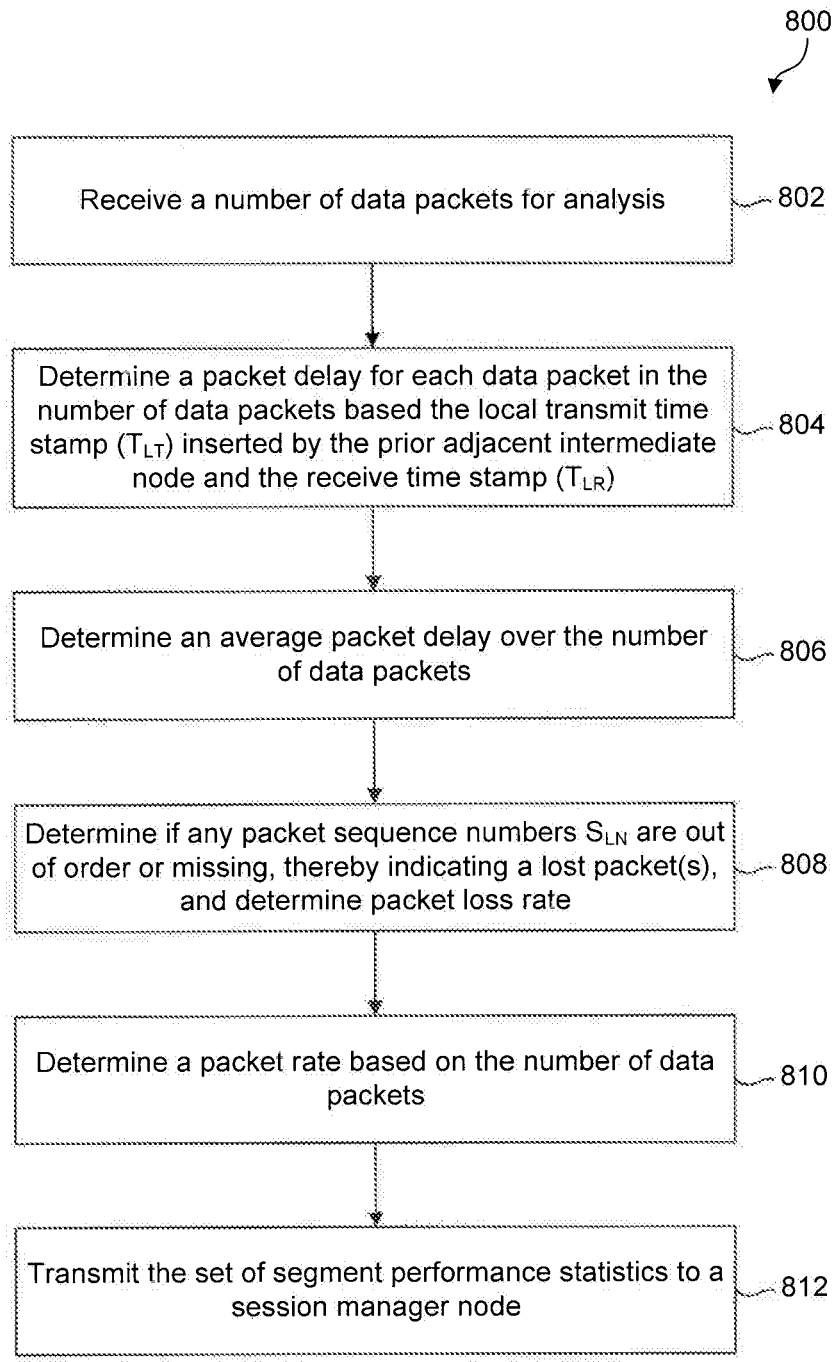
FIG. 8A illustrates a flowchart 800 that further describes the determining of segment performance statistics for the communication network according to embodiments of the disclosure.

FIG. 8A illustrates a flowchart 800 that further describes the step 304 of determining segment performance statistics for the communication path 101 according to embodiments of the disclosure when local timestamps and sequence numbers are utilized. In embodiments, the flowchart 800 is performed by the statistics processor 208 according to embodiments of the disclosure.

In step 802, the data packets are received for analysis in an intermediate node 104, one-by-one over time. For example, the statistics processor 208 can receive a number of data packets one-by-one, including their associated receive timestamps (Tr) that identify their time of receipt by the receiver PHY 202, source timestamps (Ts) that identify their time of transmit by the source 102, and sequence number (Sn) that determines their location in the sequence as determined by the source 102. Additionally, each data packet in the number of data packets can include a local receive timestamp ($T_{LR}$), a local transmit time stamp ($T_{LT}$) and a local sequence number ($S_{NL}$) inserted by each intermediate node 104 that the data packet has traversed. As indicated above, the statistics processor 208 can perform the packet-by-packet analysis during a switching function of the switch 204. Alternatively, the performance statistics can be determined based on replicated data packets, while the original data packets are re-transmitted by the appropriate transmit PHY 206.

In step 804, the statistics processor 208 can determine a packet delay for each data packet of the number of data packets on a packet-by-packet basis, where the packet delay is measured from the prior adjacent intermediate node 104 to the current intermediate node 104 that is processing the data packets, using the calculation:

packet delay=receive timestamp ($T_{LR}$) of current node 104–local transmit time stamp ($T_{LT}$) for the prior adjacent intermediate node 104.

For example, to determine the packet delay caused by segment 105-3, the intermediate node 104c subtracts (e.g., compares) local transmit time stamp ($T_{LT}$) for intermediate node 104b from its own receive timestamp ($T_{LR}$) to determine the specific packet delay caused by segment 105-3. (As indicated above, Tr is referred to as $T_{LR}$ in this section).

In step 806, the statistics processor 208 can determine an average packet delay over the number of data packets using the calculated packet delays for the number of data packets, and can determine the variation in the packet delay over the number of data packets by calculating a standard deviation. If the average packet delay for the particular intermediate node 104 exceeds the others by a threshold, then a corresponding segment 105 that services the particular intermediate node 104 can be determined to be congested. Alternatively, the average packet delay can be compared to an absolute threshold to determine congestion status.

In step 808, the statistics processor 208 can determine if any local packet sequence numbers $S_{LN}$ are missing or out of order, thereby indicating, a lost or misplaced data packet. For example, if the sequence numbers $S_{LN}$ for a particular sequence of data packets were found to be $S_1$, $S_2$, $S_4$, $S_5$, . . . , then clearly packet $S_3$ is lost or out of sequence. Additionally, since the analysis is based on the local packet sequence $S_{LN}$ inserted by the prior and adjacent intermediate node 104, it can be determined that the missing packet got lost during transmission over the immediate segment 105 that connects the prior and adjacent intermediate node 104 to the current intermediate node 104.

In step 810, the statistics processor 208 can determine the data late based on the number data packets. For example, the statistics processor 208 can determine the data rate by dividing the combined bit length of data packets by the corresponding time-for-receipt; where the combined bit length of data packets is the sum total number of bits included the number of data packets, and where the time-for-receipt is total time to receive the data packets as determined by the receive time stamps $T_{LR}$ that were created by the receiver PHY 202.

In step 812, the statistics processor 208 can cause a set of segment performance statistics to be transmitted or relayed to the session manager 110; where the set of the segment performance statistics, includes average packet delay, variation in packet delay, packet loss rate (e.g. ratio of number of packets lost to total number of packets processed), and packet rate over a number of data packets.

Figure 8B:
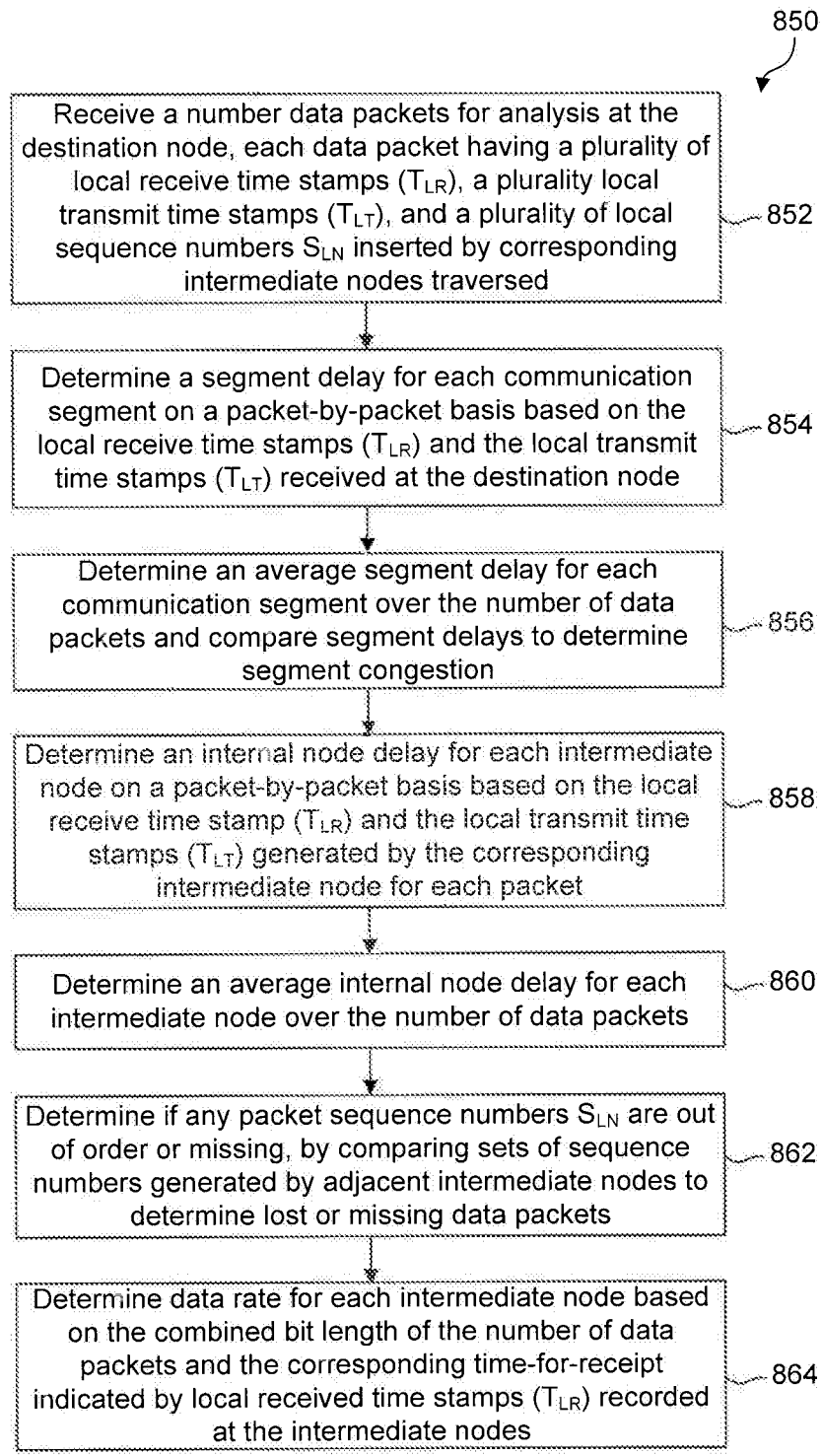
FIG. 8B illustrates a flowchart 850 that further describes the determining of segment performance statistics for the communication network at a destination node according to embodiments of the disclosure.

FIG. 8B illustrates a flowchart 850 that further describes determining segment, performance statistics for the communication path 101 according to embodiments of the disclosure when local timestamps and sequence numbers generated by the intermediate nodes 104. In embodiments, the flowchart 850 is performed by a processor in the destination node 106, such as the processor 212 of the session manager 110 in FIG. 2B.

In step 852, the data packets are received for analysis in the destination node 106, one-by-one overtime. For example, the processor 212 in destination node 106 can receive, from its corresponding receiver PHY, the data packets having the corresponding local timestamps and sequence number information. More specifically, each data packet in the number of data packets can include a local receive timestamp ($T_{LR}$), a local transmit time stamp ($T_{LT}$), and a local sequence number ($S_{NL}$) inserted by each intermediate node 104 that the data packet has traversed along the communication 101. Accordingly, each data packet can include a plurality of local receive timestamps ($T_{LR}$), a plurality of local transmit time stamps ($T_{LT}$), and a plurality of local sequence numbers ($S_{NL}$) consistent, with the number of intermediate nodes 104 that the data packet has traversed.

In step 854, the processor 212 in the destination node 106 can determine a segment delay for each segment 105 on a packet-by-packet basis. The individual segment delays can be determined based on the local receive timestamp $T_{LR}$ of the receiving node 104 and the local transmit timestamp $T_{LT}$ of the transmitting node 104 that "bookend" the particular segment 105. More specifically, the segment delay for the $i^{th}$ segment 105 is determined for each data packet according to:

$i^{th}$ segment delay=local receive timestamp $(T_{LR})^i$–
local transmit time stamp $(T_{LT})^{i-1}$; where (i) indicates the $T_{LR}$ of the receiving node 104 that data received packet and generated the local receive timestamp; and (i−1) indicates the $T_{LT}$ of the transmitting node 104 that transmitted the data packet and generated the local transmit timestamp.

For example, to determine the segment delay of segment 105-3 in FIG. 1 the processor 212 subtracts (e.g., compares) local transmit time stamp ($T_{LT}$) generated by intermediate node 104*b* from the local receive timestamp ($T_{LR}$) generated by node 104*c* to determine the segment delay caused by segment 105-3.

In step 856, the processor 212 in the destination node 106 can determine an average segment delay for each segment 105 over the number of data packets using the calculated segment delays for the number of data packets, and can determine the variation in the segment delay over the number of data packets by storing a histogram of segment delays or calculating a standard deviation. If the average segment delay for any particular intermediate segment 105 exceeds the others by a threshold, then the corresponding segment 105 can be determined to be congested. Alternatively, the average segment delay can be compared to an absolute threshold to determine congestion status.

In, step 858, the processor 212 in the destination node 106 can determine an internal node delay for each intermediate node 104 on a packet-by-packet basis, where the internal node delay is based on the local transmit time stamp ($T_{LT}$) and the local receive timestamp ($T_{LR}$) generated for each packet by the corresponding intermediate node 104. Specifically, the internal node delay for a given data packet can be determined by subtracting the local receive timestamp ($T_{LR}$) from the local transmit timestamp ($T_{LT}$) that is generated by the corresponding intermediate node 104, e.g.:

Internal node delay ($i^{th}$ node)=local transmit timestamp $(T_{LT})^i$−local receive time stamp $(T_{LT})^i$.

In step 860, the processor 212 can determine an average internal node delay for each intermediate node 104 over the number of data packets using the calculated node delays for each of the number of data packets, and can determine the variation in the node delay over the number of data packets by storing a histogram of segment delays or calculating a standard deviation. If the average internal node delay for any particular intermediate node 104 exceeds the others by a predetermined threshold, then the corresponding node 104 can be determined to be congested. Alternatively, the average internal node delay for the corresponding, intermediate node can be compared to an absolute threshold to determine congestion status.

In step 862, the processor 212 can compare adjacent sets of local packet sequence numbers $S_{LN}$ to determine if any local packet sequence numbers $S_{LN}$ are missing or out of order for each intermediate node 104, thereby indicating lost or misplaced data packet associated with the corresponding intermediate node 104. For example, if a first set of sequence numbers for a sequence of data packets at an $i^{th}$ intermediate node 104 were found to be $S_1$, $S_2$, $S_3$, $S_4$, $S_5$, ..., and a second set of sequence numbers $S_{LN}$ at the $(i+1)^{th}$ intermediate node 104 were found to be $S_1$, $S_2$, $S_3$, $S_4$, $S_5$, ...; then clearly packet $S_3$ got lost or out of sequence during transmission over the intervening segment 105 between the $i^{th}$ intermediate node 104 and the $(i+1)^{th}$ intermediate node 104. Accordingly, since the analysis is based on the local packet sequence $S_{LN}$ inserted by each intermediate node 104, it can be determined that the missing packet got lost during transmission over the particular segment 105 that served the corresponding intermediate node 104 that "records" the missing packet sequence number $S_{LN}$. More specifically, for each intermediate node 104, first and second sets of local packet sequence numbers $S_{LN}$ are compared to detect and any missing or lost packets as illustrated by the example above; where the first set are the $S_{LN}$s of the node 104 under examination, and the second set are the $S_{LN}$s of the prior adjacent, or subsequent, adjacent node 104. If the number of missing packets exceeds a predetermined threshold, then the corresponding intermediate and/or serving segments can be determined to be congested.

In step 864, the processor 212 can determine the data rate based on the number data packets. For example, the processor 212 can determine the data rate by dividing the combined bit length of data packets by the corresponding time-for-receipt; where the combined bit length of data packets is the cumulative number of bits included the number of data packets, and where the time-for-receipt is total time to receive the data packets as determined by the receive time stamps $T_{LR}$ that were created by the receiver PHY 202.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
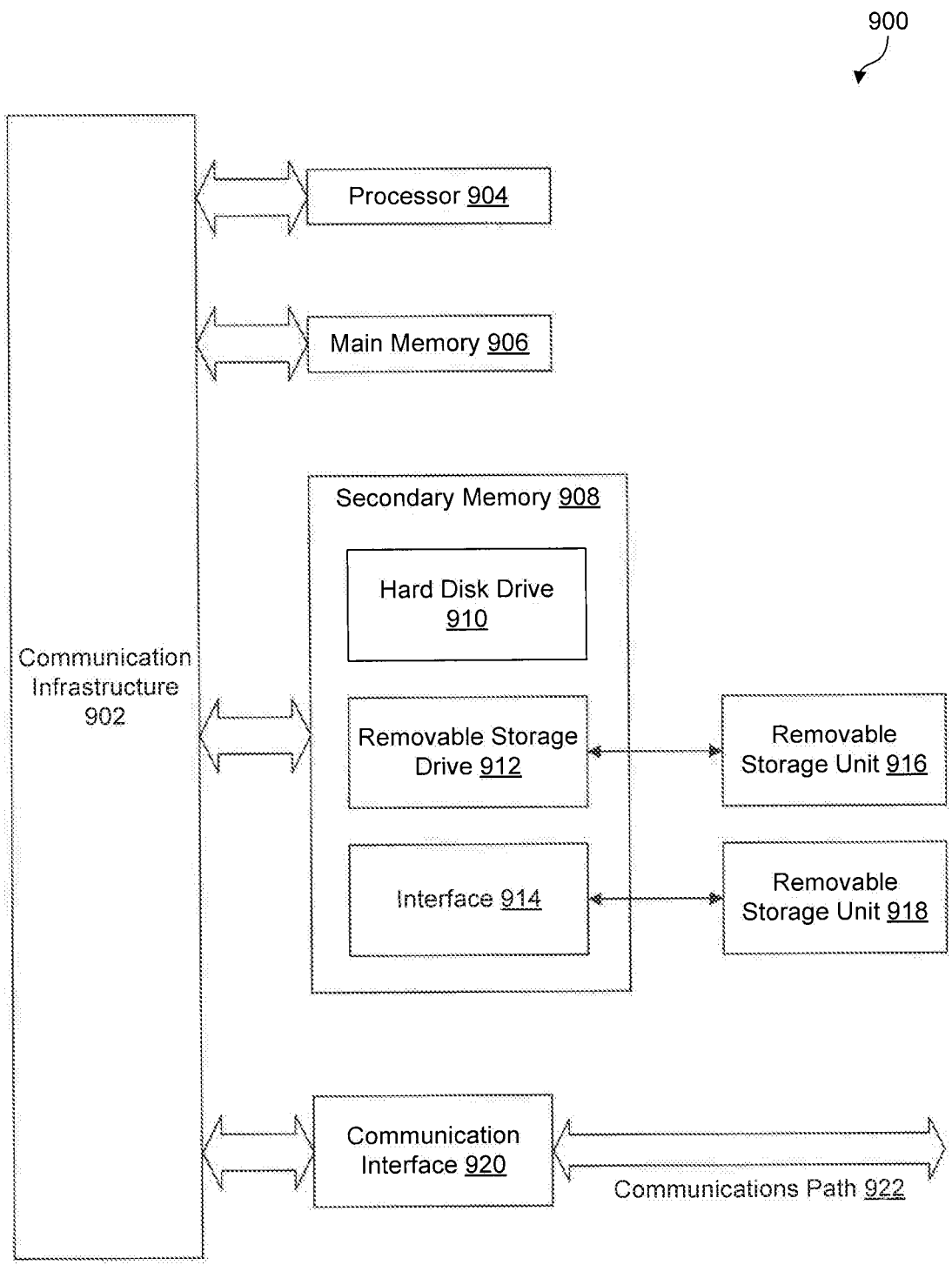
FIG. 9 illustrates an example of a computer system 900 that can be used to implement embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. Components depicted in FIG. 2A-2B, including segment statistics processor 208 and processor 212, may be implemented in whole or in part on one or more computer systems 900. Furthermore, each of the steps of the methods depicted in FIGS. 3-8A,B can be implemented or one or more computer systems 900 as will be understood by those skilled in the arts.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using, removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range, of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance provided herein.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and the like. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It is to be appreciated that the Detailed Description section, and not the Abstract section, is intended to be used to interpret the following claims. The Abstract section may set forth one or more, but not all exemplary embodiments, of the disclosure, and thus, are not intended to limit the disclosure and the appended claims in any way.

What is claimed is:

1. A method of evaluating a communication path having a source node, a destination node, and a plurality of intermediate nodes located between the source node and the destination node, the method comprising:

receiving at a first intermediate node of the plurality of intermediate nodes, a number of data packets that originated from the source node;

determining, by the first intermediate node, a first set of segment performance statistics for the communication path on a packet-by-packet basis based on the number of data packets; and transmitting, by the first intermediate node, the number of data packets to a second intermediate node of the plurality of intermediate nodes, wherein the determining includes determining a first data rate for the first intermediate node by dividing a combined bit length of packets by a time-for-receipt, wherein the combined bit length of packets is a cumulative total number of bits included in the number of data packets, and wherein the time-for-receipt is a total time to receive the number of data packets as determined by receive time stamps that were created during the receiving the number of data packets that originated from the source node.

2. The method of claim 1, further comprising:
sending, from the first intermediate node, the first set of segment performance statistics to a session manager for further evaluation.

3. The method of claim 1, further comprising:
comparing the first set of segment performance statistics determined by the first intermediate node with other sets of segment performance statics determined by corresponding other intermediate nodes to determine a relative segment quality experienced by the first intermediate node.

4. The method of claim 3, further comprising:
determining a network segment that services the first intermediate mode is congested based on the comparison of the first set of segment performance statistics with the other sets of segment performance statics.

5. The method of claim 1, wherein the determining includes:
determining a packet delay from the source node to the first intermediate node for each data packet in the number of data packets, based on a source time stamp retrieved from a corresponding data packet.

6. The method of claim 5, further comprising:
determining an average packet delay over the number of data packets; and
determining a variation of the packet delay over the number of data packets.

7. The method of claim 6, further comprising determining a congestion level between a pair of intermediate nodes in the communication path based on the average packet delay or the variation of the packet delay over the number of data packets.

8. The method claim 6, further comprising:
subtracting the average packet delay over the number of data packets from an expected packet delay for the first intermediate node to determine a first packet delay difference for the first intermediate node;
comparing the first packet delay difference for the first intermediate node to a second packet delay difference associated with the second intermediate node to determine if the first packet delay difference exceeds the second packet delay difference by a threshold; and
determining that a network segment that services the first intermediate node is congested based on the first packet delay difference exceeding the second packet delay difference by the threshold.

9. The method of claim 1, wherein each data packet of the number of data packets includes a sequence number to identify a position of the data packet in the number of data packets, the determining including:
examining sequence numbers of the number of data packets to determine any out-of-order sequence numbers or missing sequence numbers in the number of data packets, to indicate a first number of lost data packets for the first intermediate node.

10. The method of claim 9, further comprising:
comparing the first number of lost data packets for the first intermediate node with a second number of lost data packets for a third intermediate node; and
determining that a network segment that services the first intermediate node is congested based on the first number of lost packets exceeding the second number of lost packets by a threshold amount.

11. The method of claim 10, wherein the third intermediate node is disposed prior and adjacent to the first intermediate node in the communication path.

12. The method of claim 1, further comprising:
comparing the first data rate for the first intermediate node with an average data rate of other intermediate nodes of the plurality of intermediate nodes; and
determining that a network segment that services the first intermediate node is congested based on the first data rate being lower than the average data rate by a threshold amount.

13. The method of claim 1, wherein the determining includes:
replicating, by the first intermediate node, the number of data packets to generate a number of replicated data packets; and
determining, by the first intermediate node, the first set of segment performance statistics for the communication path based on the number of replicated data packets.

14. The method of claim 1, wherein the first intermediate node operates according to an Ethernet protocol.

15. An intermediate node configured to operate in a communication path of a communication network having a source node, a destination node, and a plurality of additional intermediate nodes, the intermediate node comprising:
a physical layer (PHY) receiver configured to receive a number of data packets that originated from the source node;
a segment statistics processor configured to determine a set of segment performance statistics for the communication path on a packet-by-packet basis using the number of data packets; and
a PHY transmitter configured to transmit the number of data packets over a network segment to a subsequent intermediate node of the plurality of additional intermediate nodes,
wherein the segment statistics processor is further configured to determine a data rate for the first intermediate node by dividing a combined bit length of packets by a time-for-receipt, wherein the combined bit length of packets is a cumulative total number of bits included in the number of data packets, and wherein the time-for-receipt is a total time to receive the number of data packets as determined by receive time stamps that were created by the PHY receiver during the receipt of the number of data packets that originated from the source node.

16. The intermediate node of claim 15, wherein the segment statistics processor is further configured to send the set of segment performance statistics to a session manager using the PHY transmitter.

17. The intermediate node of claim 15, wherein the segment statistics processor is further configured to:
   determine a packet delay from the source node to the intermediate node for each data packet in the number of data packets, based on a source time stamp Ts retrieved from a corresponding data packet;
   determine an average packet delay over the number of data packets; and
   determine a variation of the packet delays over the number of data packets.

18. The intermediate node of claim 15, wherein each data packet of the number of data packets includes a sequence number to identify a position of the data packet in the number of data packets, wherein the segment statistics processor is further configured to:
   examine sequence numbers of the number of data packets to determine any out-of-order sequence numbers or missing sequence numbers in the number of data packets, to identify any lost data packets for the first intermediate node.

19. The intermediate node of claim 15, wherein the number of data packets are Ethernet data packets.

20. An intermediate node configured to operate in a communication path of a communication network having a source node, a destination node, and a plurality of additional intermediate nodes, the intermediate node comprising:
   a plurality of physical layer (PHY) receivers, each PHY receiver configured to receive a number of data packets that originated from the source node;
   a plurality of PHY transmitters, each PHY transmitter configured to transmit the number of data packets over a network segment to a subsequent intermediate node of the plurality of additional intermediate nodes; and
   a switch configured to direct the number of data packets from a particular PHY receiver to a particular PHY transmitter;
   wherein the switch includes a segment statistics processor configured to determine a set of segment performance statistics for the communication path on a packet-by-packet basis using the number of data packets,
   wherein the set of segment performance statistics include an average packet delay over the number of data packets and a packet loss rate over the number of data packets, and
   wherein the segment statistics processor is further configured to determine a data rate for the first intermediate node by dividing a combined bit length of packets by a time-for-receipt, wherein the combined bit length of packets is a cumulative total number of bits included in the number of data packets, and wherein the time-for-receipt is a total time to receive the number of data packets as determined by receive time stamps that were created during receipt of the number of data packets that originated from the source node.

* * * * *